(12) United States Patent
Radina et al.

(10) Patent No.: US 12,687,200 B2
(45) Date of Patent: Jul. 21, 2026

(54) CAGE SEGMENT OF A SEGMENTED BEARING CAGE

(71) Applicant: AKTIEBOLAGET SKF, Gothenburg (SE)

(72) Inventors: Alfred Radina, Maßbach (DE); Maximilian Soellner, Bundorf (DE); Hans-Juergen Friedrich, Königsberg-Römershofen (DE); Martin Kemmer, Werneck (DE); Jesko-Henning Tanke, Schweinfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 99 days.

(21) Appl. No.: 18/654,087

(22) Filed: May 3, 2024

(65) Prior Publication Data
US 2024/0376932 A1 Nov. 14, 2024

(30) Foreign Application Priority Data
May 12, 2023 (DE) .......................... 102023204453.6

(51) Int. Cl.
*F16C 33/46* (2006.01)
*F16C 33/51* (2006.01)
*F16C 33/54* (2006.01)

(52) U.S. Cl.
CPC ........ *F16C 33/4682* (2013.01); *F16C 33/513* (2013.01); *F16C 33/543* (2013.01)

(58) Field of Classification Search
CPC .. F16C 33/42; F16C 33/4676; F16C 33/4682; F16C 33/51; F16C 33/513; F16C 33/54; F16C 33/541; F16C 33/542; F16C 33/543
See application file for complete search history.

(56) References Cited

U.S. PATENT DOCUMENTS 9,316,255 B2 4/2016 Yasuda
10,458,473 B2 10/2019 Meder et al.
(Continued)

FOREIGN PATENT DOCUMENTS

DE 102008053248 A1 4/2010
DE 102015219277 A1 4/2017
(Continued)

OTHER PUBLICATIONS

Office Action from the United States Patent Office mailed Feb. 19, 2025 in related U.S. Appl. No. 18/448,338.
(Continued)

*Primary Examiner* — James Pilkington
(74) *Attorney, Agent, or Firm* — J-TEK LAW PLLC; Scott T. Wakeman; Mark A. Ussai

(57) ABSTRACT

A cage segment for a segmented bearing cage for large rolling bearings includes first and second lateral sides and first and second ends that together define a pocket configured to receive a rolling body. The first and second lateral sides each include an inner surface configured to face a running surface of the rolling body, and the first and second ends each include an inner surface configured to face end surfaces of the rolling body. The inner surface of the first lateral side includes at least one contact element protruding into the pocket and configured to contact the at least one rolling body, and the inner contact element is continuously connected to the first lateral face. Furthermore, a material thickness of the inner contact element corresponds substantially to a material thickness of the first lateral side at a location spaced from the at least one inner contact element.

17 Claims, 3 Drawing Sheets

(56)                    References Cited

U.S. PATENT DOCUMENTS

| | | | |
|---|---|---|---|
| 11,846,320 | B2 | 12/2023 | Beyfuss et al. |
| 11,852,196 | B2 * | 12/2023 | Beyfuss ................. F16C 33/50 |
| 2018/0291959 | A1 | 10/2018 | Meder et al. |
| 2022/0403883 | A1 | 12/2022 | Beyfuss et al. |
| 2022/0403885 | A1 | 12/2022 | Beyfuss et al. |
| 2022/0403886 | A1 | 12/2022 | Beyfuss et al. |
| 2023/0220879 | A1 | 7/2023 | Beyfuss et al. |
| 2024/0077111 | A1 | 3/2024 | Beyfuss et al. |

FOREIGN PATENT DOCUMENTS

| | | | |
|---|---|---|---|
| DE | 102016208829 | A1 | 11/2017 |
| DE | 102017103761 | A1 | 8/2018 |
| DE | 102021206282 | A1 | 12/2022 |
| DE | 102021206284 | A1 | 12/2022 |
| DE | 102021206285 | A1 | 12/2022 |
| EP | 3104030 | A1 | 12/2016 |
| EP | 4105505 | A1 | 12/2022 |
| EP | 4105507 | A1 | 12/2022 |
| GB | 875234 | A | 8/1961 |

OTHER PUBLICATIONS

Extended European Search Report from the European Patent Office
dated Oct. 18, 2024 in related EP application No. 24 174 791.4
including machine translation of Search Opinion and Search Report.

* cited by examiner

CAGE SEGMENT OF A SEGMENTED BEARING CAGE

CROSS-REFERENCE

This application claims priority to German patent application no. 10 2023 204 453.6 filed on May 12, 2024, the contents of which are fully incorporated herein by reference.

TECHNOLOGICAL FIELD

The present disclosure is directed to a cage segment for a segmented bearing cage having contact elements formed in sidewalls of the cage segment and to a bearing cage formed of such cage segments.

BACKGROUND

The rolling bodies of a rolling bearing can be guided and held in the rolling bearing by rolling bearing cages. For example, the rolling bearing cage can be formed by a plurality of cage segments, each cage segment forming a pocket in which at least one rolling body can be received. During use, the rolling bodies can run at least partially on a face of the cage segment.

Elements can be provided which are configured to guide a rolling body located in the cage segment. These elements can be formed by separating a section of a side surface of the cage segment from the remaining side surface, for example by cutting, and then forming it into the element, for example by bending. However, this can have the consequence that a material thickness for the cage segment has to be increased in order to guarantee sufficient strength of the cage segment.

It is, therefore, an aspect of the present disclosure to provide a cage segment for a segment cage having improved strength.

SUMMARY

An aspect of the disclosure is a cage segment for a segmented cage, in particular for large rolling bearings. The rolling bearing can in particular be a roller bearing, i.e. a rolling bearing having roller-shaped rolling bodies such as, for example, tapered rollers, cylindrical rollers, barrels, needles and the like. Furthermore, the cage segment forms a pocket which is suitable for receiving at least one rolling body. The cage segment can in particular have two lateral faces which extend in the axial direction and are mutually spaced apart by two end faces. The end faces herein can run in the circumferential direction and lie opposite the end sides, or end faces, of a rolling body received in the pocket.

In order to increase the rigidity of the cage segment, the cage segment has, at least on a side surface which is opposite a running surface of the at least one rolling element, at least one inner contact element that projects into the pocket of the cage segment and is configured to contact the at least one rolling element. Furthermore, the at least one inner contact element is continuously connected to the side surface and therefore a higher degree of stiffness can be achieved in the roller contact region. Moreover, the presence of such a contact element allows a thinner material dimension or material thickness to be used for the cage segment while maintaining the same strength of the cage segment, as a result of which a space requirement for the cage segment can be reduced in particular in the circumferential direction. Moreover, this enables more rolling bodies to be accommodated in the rolling bearing.

Furthermore, the materially integral connection that is still present between the inner contact element and the remaining lateral face enables the strength of the cage segment to be improved. Furthermore, the at least one inner contact element can be prevented from springing back under the load exerted by the rolling bodies during use, such as can occur in the case of solutions with a clean cut, for example. A further advantage lies in that the at least one inner contact element is easier to produce.

Furthermore, the cage segment can be provided with a plurality of inner contact elements. In particular, the two lateral faces of the cage segment that lie opposite the running surface of the rolling body received in the pocket can be provided with one or a plurality of inner contact elements. The cage segment preferably has at least one first and one second inner contact element on the at least one lateral face which are mutually spaced apart in the axial direction. For example, each lateral face of the cage segment can be provided with two inner contact elements. Furthermore, the number of inner contact elements provided on a lateral face can be dependent on a size of the rolling body. In particular, the lateral faces of cage segments for larger rolling bodies, or for rolling bodies with a larger axial extent, can be provided with more than two inner contact elements.

For example, the at least one contact element can be formed by a reshaping operation carried out on the cage segment. A reshaping method in which the lateral face of the cage segment is not completely severed, or in which reshaping takes place only in the region of a material thickness of the lateral face, can advantageously be used herein. This makes it possible that a greater strength is achieved by the materially integral connection which is still present than in the case of the tabs that penetrate completely through the thickness of the sheet metal and are thus partially cleanly cut out and may additionally also spring back under a load. For example, the at least one inner contact element can be embossed.

Some reshaping processes significantly reduce a material thickness of the material being reshaped. This can make the reshaped areas less strong that the un-reshaped surrounding areas. In the present disclosure, a material thickness of the inner contact element preferably corresponds substantially to the material thickness of the remaining lateral face. In other words, the material thickness of the lateral face in the circumferential direction, in a region in which the inner contact element is provided, is substantially identical to the material thickness of the remaining lateral face. The terms "corresponds substantially" or "substantially identical" should be understood to mean that the material thickness in the region of the inner contact element is at least 95%, and preferably at least 99%, of the material thickness of the remaining lateral face. This enables the strength of the cage segment to be improved. Furthermore, the at least one contact element formed in this manner will not spring back under the load when contacted by the rolling bodies during use, as may occur in the case of solutions with a tab partially cut out of a wall of the cage segment.

Furthermore, the inner contact element can be inwardly offset by a defined offset in the circumferential direction. The defined offset can in particular be at most 60% of the material thickness of the lateral face. Should the cage segment have at least two inner contact elements on one lateral face, the first inner contact element can be inwardly offset by a defined first offset in the circumferential direction, and the second inner contact element can be inwardly offset by a defined second offset in the circumferential direction. In particular, the first and the second defined offset can be different from one another. Alternatively, the first and second offset can also be identical to one another. The defined offset is preferably chosen depending on a largest possible number of rolling bodies, a material of the cage segment and/or a material thickness of the cage segment.

According to a preferred embodiment, the cage segment has at least one outer contact element, wherein the at least one outer contact element is configured to contact at least one further rolling body which is disposed so as to be circumferentially adjacent to the cage segment. For example, the cage segment can have at least one lateral element which in the circumferential direction has a first lateral face that faces the pocket, and a second lateral face that faces away from the pocket, wherein the at least one outer contact element is formed on the second lateral face that faces away from the pocket. In particular, the inner contact element can be formed on the first lateral face and protrude into the pocket, and the outer contact element can be provided on the second lateral face.

The at least one outer contact element is preferably formed as a depression in the second lateral face of the cage segment. Such a depression can be formed by embossing, for example. A contact element which is formed as a depression on a lateral face that faces away from the pocket, or an external face of the cage segment, as a result of a larger contact face advantageously causes less contact pressure per unit area in comparison to direct contact between the rolling body and a planar external side of the cage segment. In particular, a further contact element formed as a depression can enable contact over an area instead of linear contact, as a result of which the effective contact pressure per unit area is reduced. For this purpose, the depression can be chosen in particular as a function of size and shape.

Furthermore, the cage segment can be joined from at least one sheet metal component with at least one joint. Advantageously, the at least one joint can also provide an adjustment possibility in such a way that the joint is suitable for compensating for manufacturing tolerances. As a result of the saving in terms of material and/or the reduction in manufacturing time, a cage segment made of a sheet metal component is in particular more favourable in comparison to an integral cage milled from the solid material or a segment cage of PEEK plastics material, because the material input is lower and the material utilization level is higher, on the one hand, and the manufacturing time for the cage is significantly less than in the case of conventional rolling bearing cages, on the other hand.

According to a further embodiment, the cage segment is available as a kit in a preliminary stage of manufacturing, the kit being composed of one or a plurality of flat sheet metal components which are configured to be assembled in order to form the cage segment, wherein the at least one contact element is formed in at least one of the sheet metal components of the cage segment. The at least one contact element is preferably formed in the preliminary stage of manufacturing. As a result, a material input and/or manufacturing complexity can be reduced. For example, the one or the plurality of sheet metal components of the cage segment can be cut, in particular laser-cut, punched and/or nibbled out of a metal sheet in such a way that only minor tooling costs are advantageously created. In other words, the separation lines required for the cage segment in the metal sheet are provided by means of cutting, punching, nibbling or the like. This means that the contour of the cage segment is first cut or punched into the metal sheet, and the shape of the cage segment is subsequently released from the metal sheet. A laser, a punching tool, a nibbling machine or the like can be used in the process. The cutting out of the cage segment can advantageously be integrated into automated manufacturing in an assembly line and/or assembly cell.

According to a further aspect a rolling bearing cage is assembled from a plurality of previously described cage segments. In particular, the plurality of cage segments can at least be temporality connectable by way of a coupling element. For example, the cage segments can be connected to form a closed cage. Furthermore, each second rolling body can be guided in a cage segment and/or be encompassed by a cage segment, for example. Alternatively, one cage segment can also be provided for in each case one rolling body.

According to an even further aspect a rolling bearing, in particular a large rolling bearing, has at least one inner raceway and at least one outer raceway, wherein rolling bodies are disposed between the inner raceway and the outer raceway, wherein the rolling bodies are held by a rolling bearing cage described above. Each second rolling body can preferably be guided in a cage segment and/or be encompassed by a cage segment. This makes it possible to increase the number of rollers used in the rolling bearing, because only each second rolling body is received in a cage segment, and the number of cage segments can be reduced in this way.

Another aspect of the disclosure is a cage segment for a segmented bearing cage for large rolling bearings that includes a continuous strip of sheet metal having a first end connected to a second end at a joint and bent to form a first lateral side and a second lateral side substantially parallel to the first lateral side and a first end and a second end substantially parallel to the first end, the first and second laterals sides and the first and second ends together defining a pocket configured to receive a first rolling body. The first and second lateral sides each include an inner surface configured to face a running surface of the first rolling body and an outer surface configured to face a running surface of a second rolling body located outside the pocket, and a first region of the first lateral side is reshaped to form a depression in the outer surface and a corresponding protrusion in the inner surface, the protrusion being configured to contact the first rolling body. The protrusion is continuously connected to the first lateral side, and a material thickness of the protrusion corresponds substantially to a material thickness of the first lateral side at a location that does not include a protrusion. Furthermore, the inner surface of the first lateral side lies in a first plane, an inner surface of the protrusion lies in a second plane substantially parallel to the first plane, and a distance from the first plane to the second plane is less than 60% of the material thickness of the first lateral side. Also an assembly comprising the first rolling body in the pocket in contact with the protrusion, and the second rolling body outside the pocket in contact with the outer surface of the first lateral side.

Further advantages and advantageous embodiments are set forth in the description, the drawings and the claims. The combinations of features set forth in the description and in the drawings are purely exemplary here so that the features may also be present individually or in other combinations.

BRIEF DESCRIPTION OF THE DRAWINGS

The invention is to be described in more detail hereunder by means of exemplary embodiments illustrated in the drawings. The exemplary embodiments and the combinations shown in the exemplary embodiments herein are purely exemplary and are not intended to establish the scope of protection of the invention. The latter is defined solely by the appended claims.

DETAILED DESCRIPTION

Identical or functionally equivalent elements are identified by the same reference signs hereunder.

Figure 7:
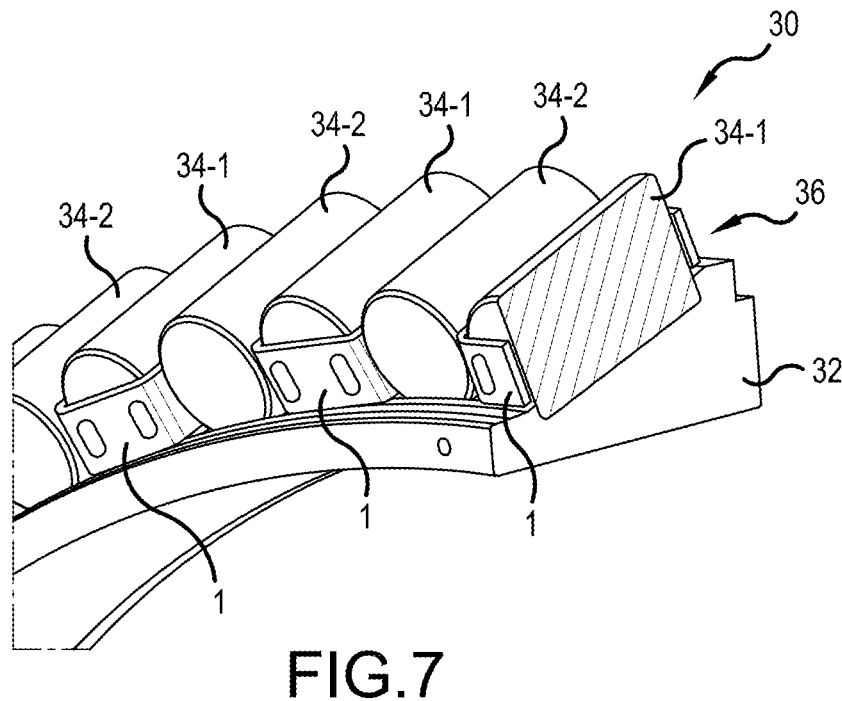
FIG. 7 is a perspective view of part of a rolling bearing assembly including the cage segments of FIG. 1.
Figure 8:
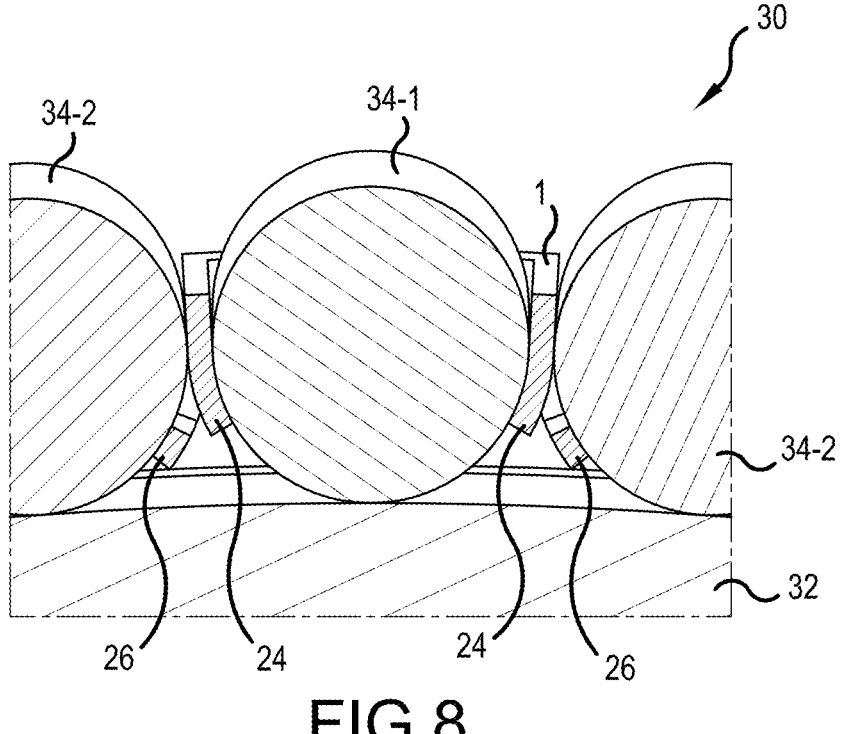
FIG. 8 is a sectional view through one of the cage segments of FIG. 7.

Referring now to FIGS. 1 to 6, a cage segment 1 includes a sheet metal component 2 having ends joined a joint 4 to form a pocket 8 which is configured to receive at least one rolling body 34. Alternatively, the cage segment can be formed from more than one sheet metal component 2 in which case is will also have more than one joint 4, for example two or four joints. In a preliminary stage of manufacturing, the cage segment 1 is composed of a kit with flat sheet metal components. The cage segment 1 can in particular be used in a rolling bearing 30 (FIGS. 7 and 8). For example, the rolling bearing 30 can be a roller bearing, i.e. a rolling bearing having roller-shaped rolling bodies such as, for example, tapered rollers, cylindrical rollers, barrels, needles and the like.

In order to assemble the cage segment 1 from the sheet metal component 2, the sheet metal component 2 is bent at defined corner regions 6 and joined at the two ends of the sheet metal component 2, as a result of which the joint 4 is formed. The joined-together cage segment 1 forms the pocket 8 which is suitable for receiving at least one rolling body, wherein the corner regions 6 form the corners of the cage segment 1. Alignment elements which may be mutually complementary, can be provided on the ends of the sheet metal component. The alignment elements can be, for example, rectangular, wave-shaped, triangular and/or polygonal toothings.

Two contacting elements 12 which protrude into the pocket 8 of the cage segment 1 and are configured to contact an end face of the rolling body 34 are provided on the two sides 10 of the cage segment 1 that lie opposite an end face of the rolling body 34.

Furthermore first and second inner contact elements 14-1, 14-2 are formed on each lateral inner face 18-1, 18-2 of the cage segment that lies opposite a running surface of the at least one rolling body. The cage segment 2 also includes lateral outer faces 19-1, 19-2 facing away from the running surface of the at least one rolling body The first and second inner contact elements 14-1, 14-2 are configured to contact the rolling body. The four inner contact elements protrude into the pocket 8 of the cage segment 1. Of course, it is also conceivable that only one inner contact element, or else more than two inner contact elements, can be provided on each of the lateral faces 18-1, 18-2. In particular, the number of inner contact elements 14 provided on each lateral face 18-1, 18-2 can depend on a size of the rolling body 34. The first and second inner contact elements 14-1, 14-2 are generally prismatic and comprise a portion of the cage segment that has been laterally shifted as shown for example, in FIG. 5. The first and second contact elements 14-1, 14-2 may therefore be referred to as first and second prismatic portions of the lateral wall of the cage segment 2.

In order to increase the strength of the cage segment 1, the contact elements 14-1, 14-2 are continuously connected to the lateral faces 18-1, 18-2. This furthermore makes it possible to achieve a higher degree of stiffness of the cage segment 1 in the roller contact region in such a way that a thinner material dimension, or material thickness, can be used for the cage segment 1 while maintaining the same strength of the cage segment 1.

Figure 6:
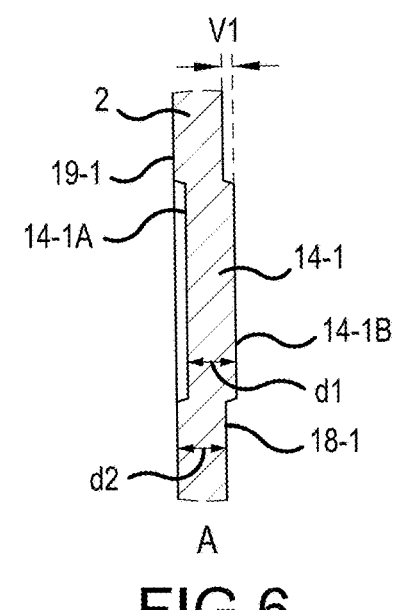
FIG. 6: is a detail view of region A in FIG. 5.

As can be seen in particular in FIG. 6, a material thickness d1 of the first inner contact element 14-1 corresponds substantially to the material thickness d2 of the remaining portion of the lateral face 18-1 from which the first inner contact element 14-1 is offset. Furthermore, the first inner contact element 14-1 is inwardly offset by a defined first offset V1 in the circumferential direction. The defined first offset V1 in particular be at most 60% of the material thickness d2 of the first lateral face 18-1. However as can be seen in FIG. 6, the first offset V1 is preferably less than 60% of the material thickness d2 of the lateral face. The portion of the laterally outer side 19-1 that is shifted to form the first inner contact element 14-1 is labelled 14-1A.

Figure 5:
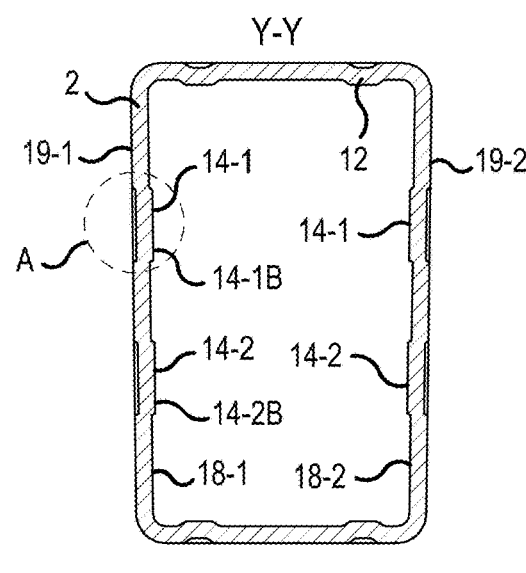
FIG. 5 is a sectional view along the line Y-Y in FIG. 4.
Figure 9:
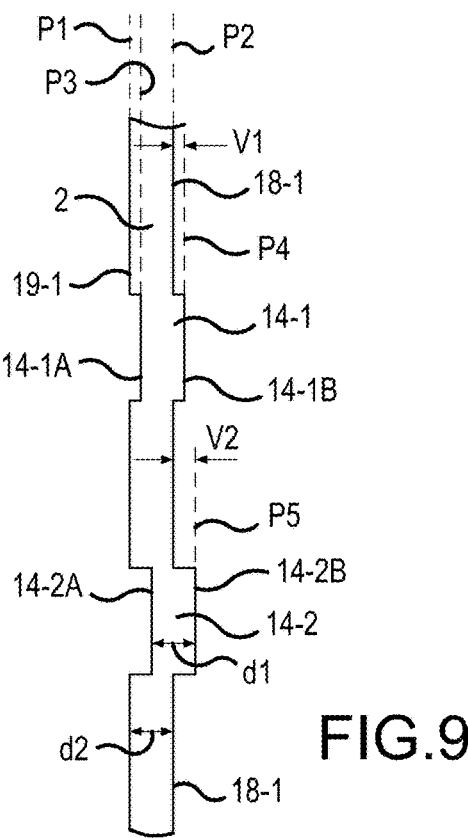
FIG. 9 is a sectional view through a lateral side of a cage segment according to a further embodiment of the disclosure.

The inner surfaces 14-1B and 14-2B of the first and second inner contact elements 14-1, 14-2 can both be offset from the first lateral face 18-1 by the same offset V1 as shown in FIG. 5. In the alternative, as shown in FIG. 9, the inner surface 14-1B of the inner contact element 14-1 can be offset from the first lateral face 18-1 by the offset V1 while the inner surface 14-2B of the second inner contact element 14-2 is offset from the first lateral face 18-1 by a second offset V2 which is different from the first offset V1. Thus, the lateral outer face 19-1 lies in a first plane P1, the first lateral face 18-1 lies in a second plane P2, the outer surface 14-1A of the first inner contact element 14-1 lies in a third plane P3, the lateral inner surface 14-1B of the first inner contact element 14-1 lies in a fourth plane P4 and the lateral inner surface 14-2B lines in a fifth plan P5.

Figures 1, 2, 3:
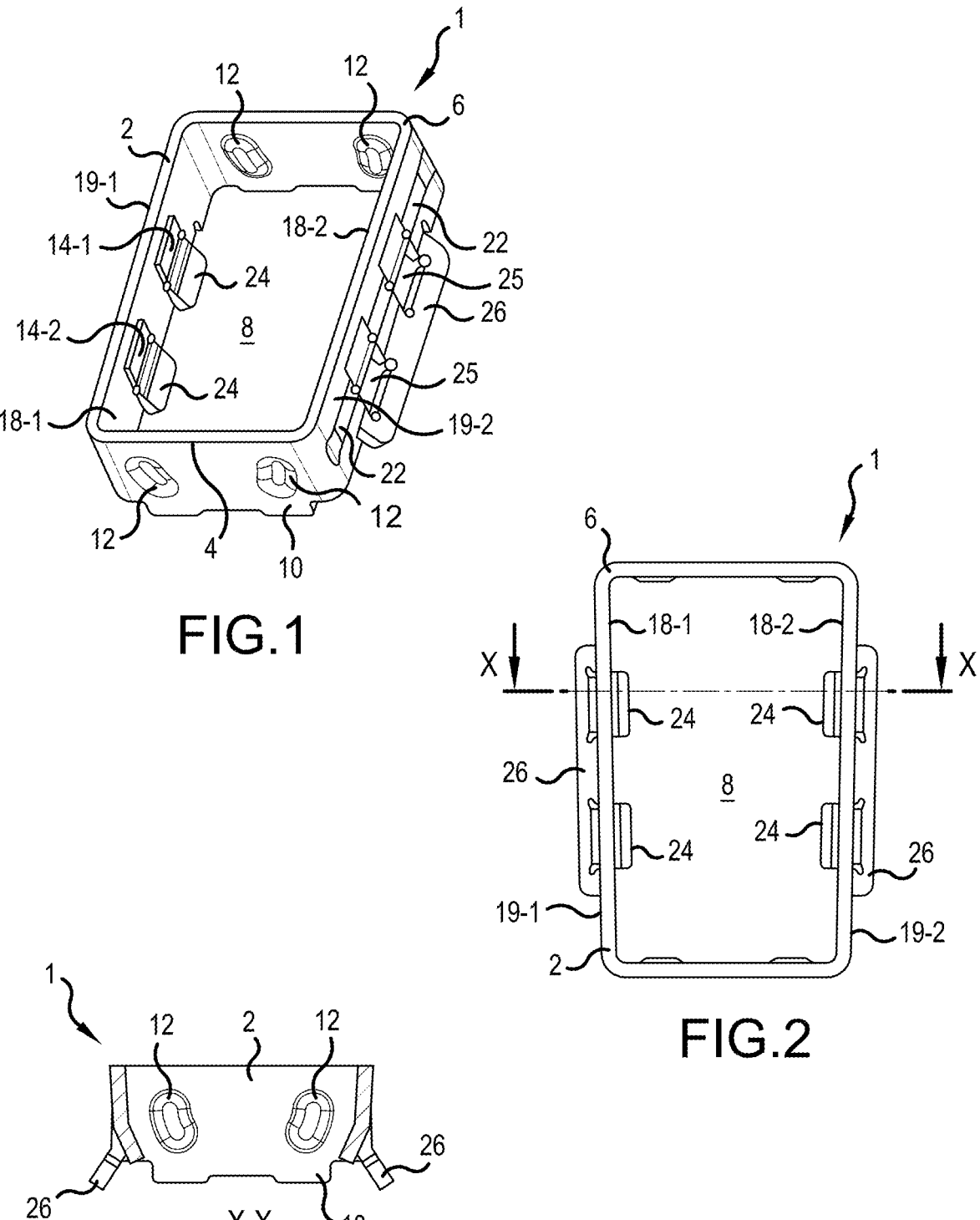
FIG. 1 is a perspective view of a cage segment according to one embodiment of the present disclosure.
FIG. 2 is a top plan view of the cage segment of FIG. 1.
FIG. 3 is a sectional view along line X-X in FIG. 2.
Figure 4:
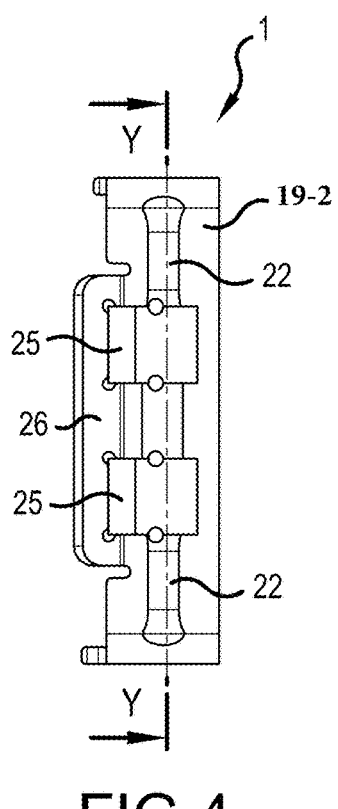
FIG. 4 is a side elevational view of the cage segment of FIG. 1.

Furthermore, the cage segment 1 on the lateral faces 19-1, 19-2 that face away from the pocket 8, or on the external face, has four outer contact elements 22. As can be seen in FIG. 4, the outer contact elements 22 are in each case formed as a depression in the second lateral face 19-2 of the cage segment 1.

The outer contact elements 22 are designed to contact a further rolling body which is disposed circumferentially adjacent to the cage segment 1, i.e. on the external side of the cage segment. This enables, for example, a rolling bearing cage to be assembled from a plurality of cage segments 1, wherein the plurality of cage segments 1 is at least temporarily connectable by way of a coupling element, and only each second rolling body is guided in a cage segment 1 and/or encompassed by a cage segment 1. This has the advantage that the number of rollers used in the rolling bearing can be increased because only each second rolling body is received in a cage segment 1, and the proportion of the circumference occupied by the material of the cage segment itself can be reduced in this way.

The first and second inner contact element 14-1, 14-2 as well as the outer contact element 22 are formed by a reshaping operation carried out on the cage segment 1. A reshaping method in which the lateral faces of the cage segment 1 are not completely severed, or in which reshaping takes place only in the region of a material thickness of the lateral faces, can advantageously be used herein. This makes it possible that a greater strength is achieved by the materially integral connection which is still present than in the case of the tabs that penetrate completely through the thickness of the sheet metal and are thus partially cleanly cut out and may additionally also spring back under a load.

In order to avoid a lifting of the cage segment 1 that may occur in the radial direction from the rolling body 34-1 received in the pocket 8 during use (FIGS. 7 and 8), holding tabs 24 are provided on the lateral face 18 that faces the pocket 8 such that they protrude inwardly into the pocket 8 and are bent into the pocket 8 in such a way that the holding tabs 24 lie below the rolling body in the radial direction. This produces openings 25 in the lateral side of the cage segment. Furthermore, a wide holding tab 26 which protrudes outwardly and is bent in such a way that the latter lies in the radial direction below the rolling body 34-2 that is disposed adjacent to the cage segment is provided on the lateral 19-1, 19-2 that faces away from the pocket 8, so as to prevent lifting of the cage segment 1 that occurs in the radial direction from the rolling body 34-2 that is disposed adjacent to the cage segment during use.

FIGS. 7 and 8 show a part of a rolling bearing 30 according to one embodiment. The rolling bearing 30 can in particular be a large rolling bearing having a diameter of more than one metre and that has an inner raceway 32 and at least one outer raceway (not illustrated). Rolling bodies 34 are disposed between the inner raceway 32 and the outer raceway, and the rolling bodies 34 are held by a rolling bearing cage 36 which is formed from a plurality of the cage segments 1 described above. Each second rolling body 34-1 herein is guided in a cage segment 1 and/or encompassed by a cage segment 1.

In summary, in order to increase the strength of the cage segment 1, the cage segment 1 at least on one lateral face 18 that lies opposite a running surface of the rolling body received in the pocket 8 of the cage segment 1 is provided with at least one contact element 14 which protrudes into the pocket 8 of the cage segment 1 and is configured to contact the rolling body. The contact element 14 herein is continuously connected to the lateral face 18. Owing to the fact that the contact element 14 is continuously connected to the lateral face 18, a higher degree of strength can be achieved in the roller contact region. Moreover, a thinner material dimension or material thickness can be used for the cage segment while maintaining the same strength of the cage segment, as a result of which a space requirement for the cage segment can be reduced in particular in the circumferential direction. Moreover, this makes it possible to accommodate more rolling bodies in the rolling bearing.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing cage segments.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A cage segment for a segmented bearing cage for rolling bearings, the cage segment comprising:
   a first lateral side and a second lateral side and a first end and a second end that together define a pocket configured to receive a rolling body,
   wherein the first and second lateral sides each include an inner surface configured to face a running surface of the rolling body, and the first and second ends each include an inner surface configured to face end surfaces of the rolling body,
   wherein the inner surface of the first lateral side includes at least one inner contact element protruding into the pocket and configured to contact the at least one rolling body,
   wherein the at least one inner contact element is continuously connected to the first lateral face,
   wherein a material thickness of the at least one inner contact element corresponds substantially to a material thickness of a portion of the first lateral side spaced from and surrounding the at least one inner contact element,
   wherein the at least one inner contact element comprises a first inner contact element having an axial length and a second inner contact element having an axial length axially spaced from the first inner contact element,
   wherein a first portion of the lateral side adjacent to the first inner contact element is punched to form a first tab extending into the pocket and a first opening and a second portion of the lateral side adjacent to the second inner contact element is punched to form a second tab extending into the pocket and a second opening, and
   wherein a third portion of the first lateral wall including the first and second openings is bent away from the pocket.

2. A cage segment for a segmented bearing cage for rolling bearings, the cage segment comprising:
   a first lateral wall and a second lateral wall each having an inner surface and an outer surface, and a first end wall and a second end wall each having an inner surface and an outer surface, the inner surfaces of the first and second lateral walls and the inner surfaces of the first and second end walls together defining a pocket configured to receive a first rolling body,
   wherein the inner surfaces of the first and second lateral walls are configured to face a running surface of the first rolling body, and the inner surfaces of the first and second end walls are configured to face end surfaces of the first rolling body, wherein the outer surface of the first lateral wall lies in a first plane and the inner surface of the first lateral wall lies in a second plane parallel to the first plane, wherein a prismatic first portion of the first lateral wall is offset into the pocket such that the outer surface of the prismatic first portion lies in a third plane between the first plane and the second plane and the inner surface of the prismatic first portion lines in a fourth plane between the second plane and the inner surface of the second lateral wall, wherein the inner surface of the prismatic first portion is configured to contact the at least one rolling body, and wherein a material thickness of the prismatic first portion, in a direction perpendicular to the first plane, is at least 95% of a material thickness of the first lateral wall, in a direction perpendicular to the first plane, at a location spaced from the prismatic first portion.

3. The cage segment according to claim 2, wherein the prismatic first portion includes first and second sides extending from the second plane to the third plane, wherein the first and second sides face in axially opposite directions, and wherein the first and second sides are perpendicular to the second plane.

4. The cage segment according to claim 2, including an opening in the outer surface of the first lateral wall having a perimeter that corresponds in size and shape to a perimeter of the inner surface of the prismatic first portion, wherein the opening is aligned in a circumferential direction with the prismatic first portion.

5. The cage segment according to claim 2, wherein the prismatic first portion is a rectangular prism.

6. The cage segment according to claim 5, wherein the prismatic first portion is formed by a reshaping process.

7. The cage segment according to claim 5, wherein the prismatic first portion includes first and second sides extending from the second plane to the third plane, wherein the first and second sides face in axially opposite directions, and wherein the first and second sides are perpendicular to the second plane.

8. The cage segment according to claim 7, including an opening in the outer surface of the first lateral wall having a perimeter that corresponds in size and shape to a perimeter of the inner surface of the prismatic first portion, wherein the opening is aligned in a circumferential direction with the prismatic first portion.

9. The cage segment according to claim 5, wherein the first and second lateral walls and the first and second end walls are formed from at least one strip of sheet metal having at least two ends connected at a joint.

10. The cage segment according to claim 5, wherein the first and second lateral walls and the first and second end walls are formed from a continuous strip of sheet metal having two ends connected at a joint.

11. The cage segment according to claim 10, wherein a distance from the first plane to the third plane is less than 60% of the material thickness of the first lateral wall.

12. The cage segment according to claim 10, wherein a prismatic second portion of the first lateral wall is offset into the pocket, the prismatic first and second portions of the first lateral wall being spaced apart in an axial direction.

13. The cage segment according to claim 12, wherein the inner surface of the prismatic second portion lines in a fifth plane between the fourth plane and the inner surface of the second lateral wall.

14. The cage segment according to claim 10, wherein the outer surface of the first lateral wall includes at least one outer contact element, and wherein the at least one outer contact element is configured to contact a second rolling body, the second rolling body being disposed outside the pocket.

15. The cage segment according to claim 14, wherein the at least one outer contact element comprises a depression in the outer surface of the first lateral wall.

16. A rolling bearing cage comprising a plurality of cage segments according to claim 5.

17. A rolling bearing comprising:

a rolling bearing cage according to claim 16.

* * * * *